United States Patent [19]
Keienburg et al.

[11] 3,744,345
[45] July 10, 1973

[54] CHANGE GEAR TRANSMISSION FOR MOTOR VEHICLES

[75] Inventors: Heinz Keienburg, Cologne; Wilhelm Jansen, Bensberg-Refrath, both of Germany

[73] Assignee: Klockner-Humboldt Deutz Aktiengesellschaft, Cologne-Deutz, Germany

[22] Filed: Apr. 12, 1972

[21] Appl. No.: 243,180

[52] U.S. Cl. .................................................. 74/745
[51] Int. Cl. ............................................... F16h 3/02
[58] Field of Search ..................................... 74/745

[56] References Cited
UNITED STATES PATENTS

| | | | |
|---|---|---|---|
| 2,886,982 | 5/1959 | Thomas | 74/745 |
| 3,229,551 | 1/1966 | Stuckey | 74/745 |
| 3,255,644 | 6/1966 | Warren et al. | 74/745 |
| 3,354,745 | 11/1967 | De Castelet | 74/745 X |

*Primary Examiner*—Arthur T. McKeon
*Attorney*—Walter Becker

[57] ABSTRACT

A change gear transmission comprising groups of gears for motor vehicles, especially tractors, in which between a gear pair driven by the input shaft of an auxiliary transmission or driving the output portion of the auxiliary transmission, on one hand, and the gear pair, on the other hand, there is arranged an additional gear pair which comprises a gear freely rotatable on the counter shaft of a main transmission group and adapted selectively to be coupled to the counter shaft, a gear pair being provided which is adapted selectively directly or indirectly to be coupled to a coaxial gear which forms a part of the velocity range of the main transmission group and pertains to the auxiliary transmission.

22 Claims, 4 Drawing Figures

FIG. 1

Patented July 10, 1973 3,744,345

CHANGE GEAR TRANSMISSION FOR MOTOR VEHICLES

The present invention relates to change gear transmissions for motor vehicles, especially for agricultural tractors and/or tractors on roads, with an auxiliary transmission preceding or following a main group transmission. The auxiliary transmission has two pairs of gears one of which also forms a velocity range of the main transmission group and has a gear which is nonrotatably connected to the counter shaft. The counter shaft is adapted to be coupled to the drive or output shaft of the auxiliary transmission or to a gear which is freely rotatable and coaxially arranged to the counter shaft, the last mentioned gear pertaining to the other pair of gears which is adapted to be driven by the drive shaft of the auxiliary transmission or the output shaft thereof.

With motor vehicles used in agriculture there exists the problem to be able to carry out soil working operations at a speed range of from 0.9 to 9 km/h, as for instance planting, cultivating and plowing, and also to carry out transporting operations at a speed range of from 3 to 20 km/h or a maximum of from 30 to 50 km/h, while the driving engine should be operable under optimum conditions and at a good degree of efficiency.

Similarly, with motor vehicles employed in connection with municipal work projects, especially with rotary ditch diggers or snow plows, there exists the problem to be able to carry out such operations at a velocity range of from 0.9 to 2 km/h and also to be able to carry out transporting operations at a relatively high velocity range. In the above mentioned two examples of employment it has been found that with change gear transmissions of the above mentioned type the above outlined operations cannot continuously be carried out in a favorable velocity range so that an optimum exploitation of the driving engine is not assured.

This is due to the fact that the velocity ranges in the main transmission group cannot be sufficiently stepped in combination with the two shiftable stages of the auxiliary transmission. In addition thereto, when employing change gear transmissions of the above mentioned type it has been found that for certain kinds of employment, especially for plowing, it is desirable from an engaged velocity range of the main transmission group to be able to shift over to velocity ranges which represent approximately a 50 percent increase or reduction of the absolute driving speed.

Based on these findings, it is an object of the present invention to provide a change gear transmission of the above mentioned general character which with structurally simple means will make it possible to realize the maximum and minimum speeds for the above described employment uses within a wide preselection range and with a fine stepping of the velocity ranges and with a high degree of efficiency.

It is a further object of this invention to provide a change gear transmission as set forth in the preceding paragraph, according to which with a minimum of gears and shifting means in the velocity ranges which are primarily working under full load, there will be only two gears in mesh under full load in the entire change gear transmission.

It is a still further object of this invention to provide a change gear transmission as set forth in the preceding paragraphs which will make it possible with one of the velocity ranges of the auxiliary transmission to preselect an extremely high transmission ratio independently of the speed ranges of the main transmission group.

These and other objects and advantages of the invention will appear more clearly from the following specification in connection with the accompanying drawings, in which.

The change gear transmission according to the present invention is characterized primarily in that between the gear pair which is driven by the input shaft of the group transmission or the gear pair driving the output shaft of the group transmission, on one hand, and the gear pair of the auxiliary transmission which last mentioned gear pair also forms a velocity range of the main transmission group, on the other hand, there is provided a further gear pair which includes a gear which is freely rotatably arranged on the counter shaft of the main transmission group and is adapted selectively to be coupled with the main transmission group, and furthermore includes a gear which is adapted selectively to be coupled directly or indirectly to a coaxial gear which pertains to the gear pair of the auxiliary transmission and also forms a velocity range or velocity stage of the main transmission group.

A change gear transmission of this construction will with a proper design of the main transmission group bring about not only a reduction in the steps from one velocity range to another velocity range but will also be characterized in that in the velocity ranges which are operated at full output there will be obtained a minimum of gears of interengaged gears under load which will result in a high degree of efficiency of the transmission. A transmission according to the present invention has the further advantage that only an extremely small number of gears is necessary for building up the transmission. This is due to the fact that for $n$ forward velocity ranges in the change gear transmission according to the invention only $n$ gears including the gears for the reversing stages are necessary. Moreover, the design of the change gear transmission according to the invention offers the advantageous possibility to provide one of the velocity ranges of the auxiliary transmission with a relatively high velocity step. In addition thereto, the change gear transmission according to the invention has the advantage that it is extremely easily shiftable and has an extremely compact construction. This is due to the fact that with a new change gear transmission according to the invention, in view of the small number of gears, the rotating masses of the gears are particularly low.

Figure 1:
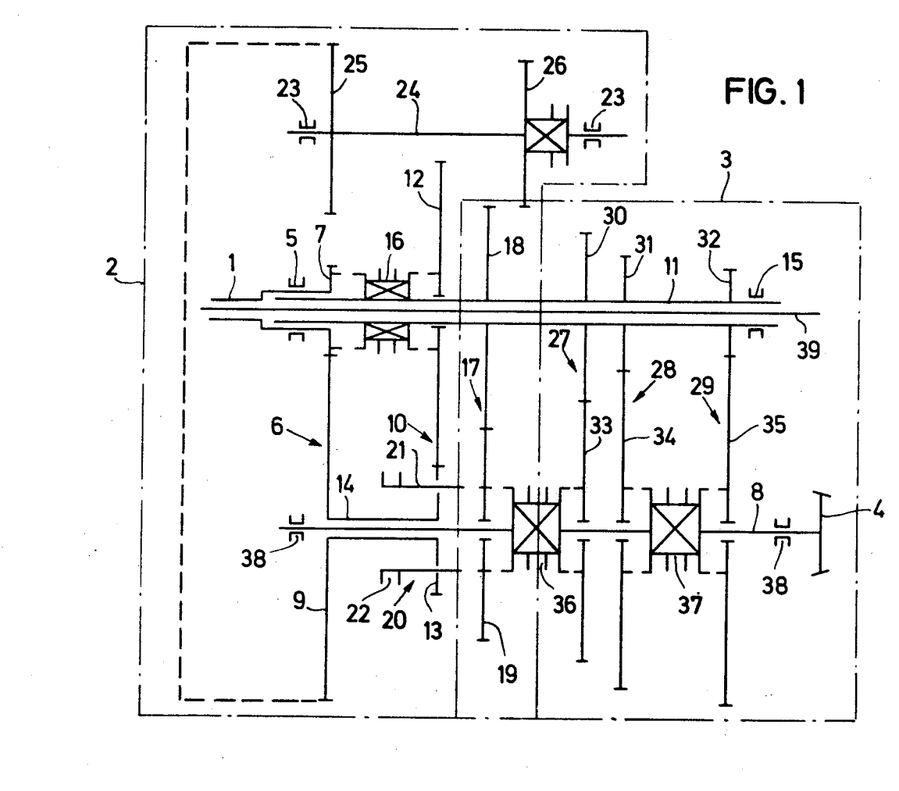
FIG. 1 diagrammatically illustrates a change gear transmission according to the invention with a counter shaft which is arranged coaxially with regard to the drive shaft of the auxiliary transmission and which pertains to a main transmission group following the auxiliary transmission.

Referring now to the drawings in detail and FIG. 1 thereof in particular, a drive shaft or input shaft 1 designed as hollow shaft and pertaining to the change gear transmission according to the invention is driven by one of the secondary members of a double clutch connected to the centrifugal mass of a driving engine. The change gear transmission, in addition to comprising an auxiliary transmission 2 adapted to be driven by the drive shaft 1, includes a main transmission group 3 following the auxiliary transmission 2. The main transmission group 3 is adapted directly or indirectly to drive a driving axle through the intervention of a partially illustrated bevel gear drive 4. The drive or input shaft 1 of the auxiliary transmission 2 has its right-hand end portion journalled in a bearing 5 of the non-illustrated housing of the auxiliary transmission 2. The auxiliary transmission 2 has a pair of gears 6 which comprises a gear 7 non-rotatably connected to the drive shaft 1, and furthermore comprises a gear 9 which meshes with the gear 7 and is freely rotatable on an output shaft 8 of the main transmission group 3.

Furthermore, the auxiliary transmission 2 includes a pair of gears 10 comprising a gear 12 which is freely rotatable on a counter shaft 11 of the main transmission 3, and also comprises a gear 13 which is mounted on the output shaft 8. Gear 13 is through the intervention of a counter shaft portion 14 non-rotatably connected to the gear 9. The gears 6 in combination with the pair of gears 10 has a total transmission ratio of approximately 1 : 4.5. Between the two gears 7 and 12, on the counter shaft 11 having its left-hand end portion journalled in output shaft 1 and having its right-hand end portion journalled in a bearing 15 of the housing of the main transmission 3, there is arranged a double shift member which forms a double shift sleeve 16. By means of the sleeve 16, in a transmission stage S of the group transmission for transporting operations, the counter shaft 11 is adapted to be directly coupled to the input shaft 1. On the other hand, in a control stage K of the auxiliary transmission 2, the gear 12 is coupled to the counter shaft 11. When the double shift sleeve 16 occupies its control position K, the counter shaft 11 is through the pair of gears 6 and 10 driven by the input shaft 1 at a transmission ratio of 1 : 4.5.

The auxiliary transmission 2 furthermore includes a third pair of gears 17 which comprises a gear 18 non-rotatably connected to the counter shaft 11 and also comprises a gear 19 which is freely rotatably journalled on the output shaft 8. The gear pair 17, in addition to forming a velocity range A of the auxiliary transmission 2 for working the soil, also serves for forming the velocity range IV of the main transmission group 3. For purposes of engaging the transmission stage A, the gear 19 is adapted by a bolt shift member 20 to be coupled to the counter shaft portion 14 of the auxiliary transmission 2. The member 20 comprises a shift bolt 21 which is axially displaceably guided in gear 13. The control bolt 21 is bridged between the two gears 9 and 13 by a shift ring 22. The shift ring 22 is engaged by a non-illustrated control fork which is under the influence of a likewise non-illustrated shift lever, the shift lever at the same time being operatively connected or coupled to the double shift sleeve 16. The total transmission ratio of the two gear pairs 16 and 17 is to be so selected that a total transmission ratio of from 1 to 2.1 is obtained.

The auxiliary transmission 2 furthermore comprises a reversible shaft 24 which is parallel to the counter shaft 14 and to the counter shaft 11 and is journalled in bearings 23. The reversible shaft 24 is equipped with a non-rotatable reversing gear 25 which continuously meshes with the gear 9. For purposes of engaging the reversing stage of the auxiliary transmission 2, the reversing shaft 24 is furthermore provided with a non-rotatable but axially displaceable reversing gear 26 which is located on the reversing shaft 24. The reversing gear 26 is by movement out of the illustrated position toward the left caused to mesh with the gear 18 in a control position or speed range R of the auxiliary transmission 2.

In addition to the gear pair 17, the counter shaft 11 and the output shaft 8, the main transmission group 3 is formed by three additional gear pairs 27, 28 and 29 respectively. The gear pairs 27, 28 and 29 have a gear 30, 31 and 32 respectively non-rotatably connected to the counter shaft 11. In addition thereto, the gear pairs 27, 28 and 29 respectively have a gear 33, 34 and 35 freely rotatably mounted on the output shaft 8. For purposes of engaging the velocity range IV which is also formed by the gear pair 17, and for purposes of engaging the velocity range III of the main transmission group which velocity range is formed by the gear pair 27, there is provided a double shaft sleeve 36 which is located between the two gears 19 and 33 on the output shaft 8. By means of the sleeve 36, the gear 19 and the gear 33 are respectively adapted to be selectively coupled to the output shaft 8. Between the two gears 34 and 35, a double shift sleeve 37 is arranged on the output shaft 8. By the displacement of sleeve 37 toward the right, the gear 35 which forms a part of the velocity range I and by displacement of sleeve 37 toward the left, the gear 34 which forms a part of the velocity range II of the main transmission group 3 is coupled to the output shaft 8.

In addition to the above mentioned structural elements, the change gear transmission also comprises a bearing 38 which serves for journalling the output shaft 8, and furthermore comprises an auxiliary drive shaft 39 which is coaxial to the input shaft 1 and the hollow counter shaft 11 and serves for a power take-off shaft. The auxiliary drive shaft 39 is by means of the second secondary part which pertains to the above referred to but not illustrated double clutch adapted to be engaged and disengaged by itself selectively to be driven whenever desired.

Figure 2:
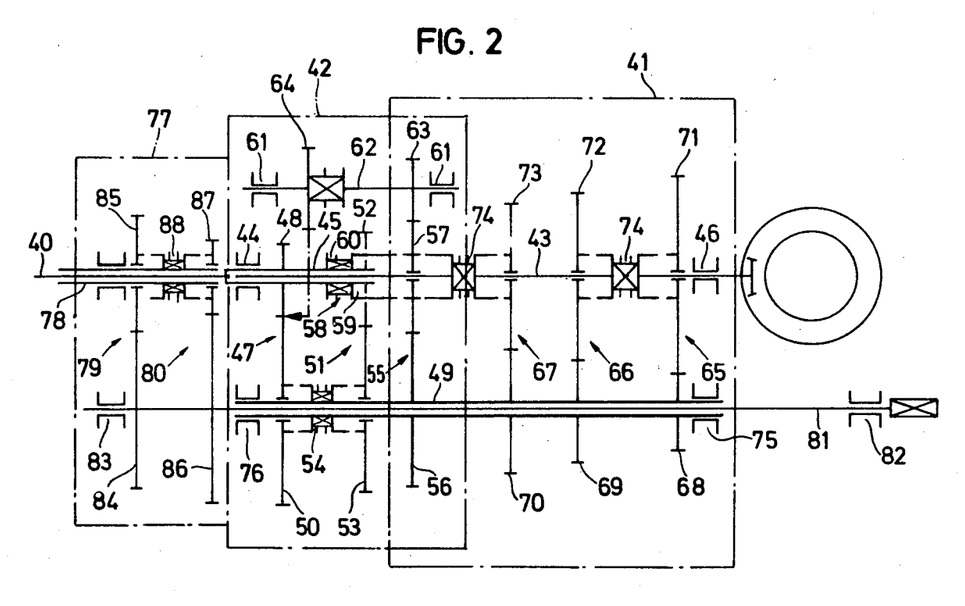
FIG. 2 illustrates an embodiment of the present invention according to which the input shaft of the auxiliary transmission is coaxial to the output shaft of a main transmission group which follows the auxiliary transmission.

With the embodiment illustrated in FIG. 2 and in contradistinction to the embodiment of FIG. 1, an input shaft 40, which is driven in the same manner as the input shaft of FIG. 1 and pertains to an auxiliary transmission 42 preceding the main transmission group 41, has its right-hand end portion journalled in a bearing 44 and in a manner coaxial to an output shaft 43 of the main transmission group. For journalling the left-hand end portion of the input shaft 43 there is provided a hollow input shaft portion 45 of the output shaft 40. For journalling the right-hand end portion of the output shaft 43 there is provided a bearing 46 which is located in the non-illustrated housing of the main transmission group 41. The auxiliary transmission 42 of FIG. 2 furthermore comprises a gear pair 47 with a gear 48 which is non-rotatably mounted on the input shaft 45 and also comprises a gear 50 which meshes with the gear 48 and is freely rotatable on a counter shaft 49 to the main transmission group 41. In addition to the gear pair 47, the main transmission furthermore comprises a second gear pair 51 which, in conformity with the present invention, is arranged in the main transmission. The gear pair 51 has associated therewith a gear 52 which is non-rotatably mounted on the input shaft 45 and also comprises a gear 53 which meshes with the gear 52 and is freely rotatably mounted on the counter shaft 49.

For purposes of engaging the lowest transmission stage K which is formed by the gear pair 47 of the auxiliary transmission 42, and for purposes of engaging the velocity stage A formed by the gear pair 51, there is between the two gear pairs 47, 51 on the counter shaft 49 provided a double control sleeve 54 which is non-rotatable but displaceable, and by means of the sleeve 54 the gear 50 or gear 53 is adapted to be coupled to the counter shaft 49.

Moreover, the auxiliary transmission 42 comprises an additional gear pair 55 which at the same time forms a part of the control stage IV of the main transmission group 41. The gear pair 55 comprises a gear 56 which is non-rotatably arranged on the counter shaft 49 and also comprises a gear 57 which is freely rotatably arranged on the output shaft 43. For purposes of engaging the velocity range S intended primarily for street driving, the gear 57 is by means of a bolt control member 58 adapted to be coupled to the input shaft portion 45.

The bolt control element 58 has control bolts 59 which are axially guided in the gear 52 and which are bridged between the two gears 48 and 52 by a control ring 60. The control ring 60 is engaged by a non-illustrated control fork which is under the influence of a shift lever that at the same time acts upon the double shift sleeve 54.

In addition thereto, the auxiliary transmission 42 has a reversing shaft 62 equipped with a reversing gear 63 which is non-rotatably connected to the reversing shaft 62 and which continuously meshes with the gear 57. For purposes of engaging a reversing stage R of the auxiliary transmission 42, the reversing shaft 62 has non-rotatably but axially displaceably mounted thereon a further reversing gear 64 which in the engaging position R is brought into mesh with the gear 50.

The main transmission group 41 of the change gear transmission according to FIG. 2, in addition to the gear pair 55 which in part forms the transmission stage IV of the change gear transmission, comprises further gear pairs 65, 66 and 67 which form the gear stages or speed ranges I, II and III respectively. The gear pairs 65 – 67 are respectively provided with a gear 68, 69 and 70 non-rotatably mounted on a counter shaft 49. These gears 68 – 70 respectively mesh with gears 71, 72 and 73 which are freely rotatably mounted on the output shaft 43. In order to engage the speed ranges I and II of the main transmission group 41, the output shaft 43 has between the two gears 71 and 72 non-rotatably and axially displaceably mounted thereon a double shift sleeve 74 by means of which selectively the two gears 72, 73 are adapted to be coupled to the output shaft 43. Between the two gears 57 and 73 on output shaft 43 there is non-rotatably and displaceably mounted a double shift sleeve 74 by means of which by coupling the gears 73, 57 to the output shaft 43 the speed range III and IV respectively of the main transmission group 41 is engaged.

As bearing for the counter shaft 49 of the main transmission group 41 there is for the right-hand end portion provided a bearing 75 in the housing of the main transmission group 41, whereas for the left-hand end portion there is provided a bearing 76 in the housing of the auxiliary transmission 42.

In addition to the above mentioned structural elements, the change gear transmission according to FIG. 2 comprises a two stage power take-off transmission 77 which precedes the auxiliary transmission 42. The power take-off transmission 77 has a hollow shaft 78 which is adapted selectively to be driven by the above mentioned double clutch. The transmission 77 furthermore has two gear pairs 79 and 80 adapted selectively to be coupled to the hollow shaft 78, and furthermore comprises a take-off shaft 81 which is adapted to be driven by the gear pairs 79, 80 and is passed through the hollow counter shaft 49 and is journalled in bearings 82, 83. The gear pair 79 has a gear 84 which is non-rotatably mounted on the take-off shaft 81 and also has a gear 85 which is freely rotatably mounted on the hollow shaft 78. The gear pair 80 comprises a gear 86 which is non-rotatably mounted on the take-off shaft 81, and also comprises a gear 87 which is freely rotatable on hollow shaft 78. Between the two gears 85 and 87 a double shift sleeve 88 is non-rotatably mounted and axially displaceable on the hollow shaft 78. By coupling the gear 85 to the hollow shaft 78 by means of the double shift sleeve 88, the normal speed of $n = 1,000$ rpm is made effective for the take-off shaft 81, whereas by coupling the gear 87 to the hollow shaft 78 by means of the double shift sleeve 88, the normal speed of $n = 500$ rpm is made effective for the take-off shaft 81.

It may be mentioned that according to the embodiment of FIG. 1 as well as according to the embodiment of FIG. 2 there exists the advantageous possibility to arrange a further reversing shaft 24, 62 in addition to the reversing shaft 26, 64. This additional reversing gear may selectively be brought into mesh with the gear 13 or 53 so that with both embodiments according to the invention a doubling of the shiftable rearward speeds is obtainable.

Figure 3:
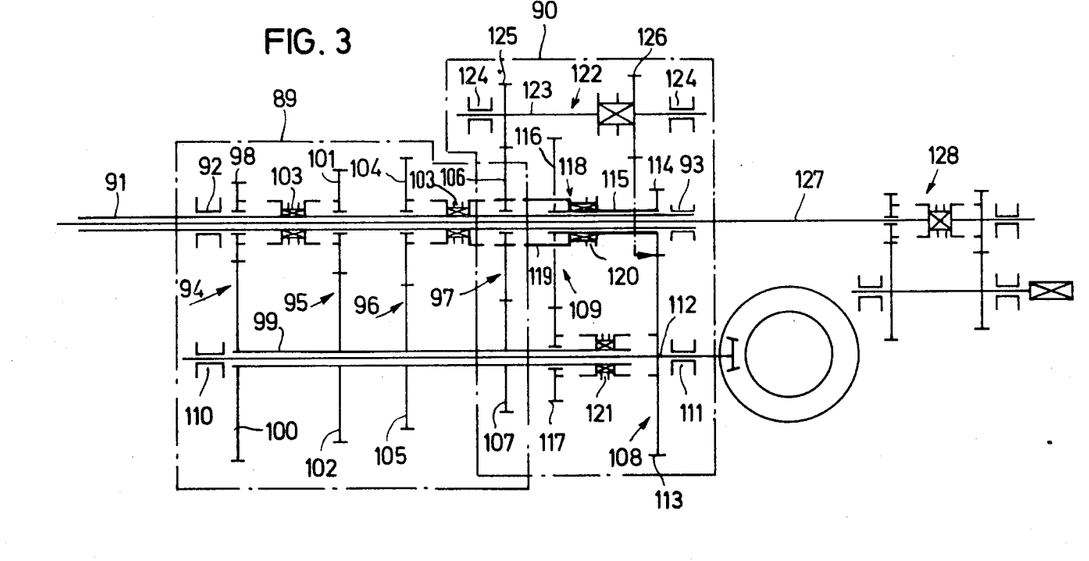
FIG. 3 represents a change gear transmission according to the invention with an outputshaft of a following auxiliary transmission, the output shaft being arranged parallel to the input shaft of the main transmission group.

The change gear transmission illustrated in FIG. 3 has a main transmission group 89 and an auxiliary group 90 following the latter. The main transmission group 89 comprises an input shaft 91 which is adapted to be driven by the non-illustrated prime mover through a secondary part of a non-illustrated double friction clutch. As bearing means for the input shaft 91 there is employed a bearing 92 arranged in the housing of the main transmission group 89 and a bearing 93 arranged in the housing of the auxiliary transmission 90. The main transmission group 89 has its velocity stages respectively formed by gear pairs 94, 95, 96 and 97. The gear pair 94 comprises a gear 98 which is freely rotatably mounted on the input shaft 91, and also has a gear 100 which is non-rotatably mounted on a counter shaft 99 that is parallel to the input shaft 91. The counter shaft 99 is in the velocity range I driven through the intervention of the gear 100. The velocity range II is formed by means of the gear pair 95 which comprises a gear 101 that is freely rotatably mounted on the input shaft 91, and also comprises a gear 102 which is non-rotatably connected to the counter shaft 99. The engagement of the velocity ranges I and II is effected by a double shift sleeve 103 which is non-rotatably but axially displaceably mounted on the input shaft 91 between the two gears 98 and 101. The velocity range III is formed by the gear pair 96 which comprises a gear 104 freely rotatable on the input shaft 91, and also comprises a gear 105 which is non-rotatably mounted on the counter shaft 99. The gear pair 97 has a gear 106 which is freely rotatable on the input shaft 91, and also comprises a gear 107 which is non-rotatably mounted on the counter shaft 99 and meshes with the gear 106. The two gears 106 and 107 form the velocity range IV of the main transmission group 89 and serve as first gear pair of the auxiliary transmission 90. For engaging the velocity ranges III and IV, between the two gears 104 and 106 a further double shift sleeve 103 is non-rotatably but axially displaceably mounted on the input shaft 91. In the velocity range III, the gear 104 is by means of the double shift sleeve 103 coupled to the input shaft 91, whereas in the velocity range IV the gear 106 is by means of the sleeve 103 coupled to the input shaft 91.

In addition to the above mentioned gear pair 97, the auxiliary transmission 90 includes a gear pair 108 and a further gear pair 109 arranged between the gear pair 108 and the gear pair 97. The gear pair 109 also forms a part of the construction according to the invention. The gear pair 108 has a gear 113 which is non-rotatably mounted on an output shaft 112 journalled in bearings 110, 111. The gear pair 108 furthermore comprises a gear 114 which meshes with the gear 113 and which is non-rotatably mounted on a counter shaft portion 115 journalled on the input shaft 91. Also the gear pair 109 has a gear 116 which is non-rotatably mounted on the counter shaft portion 115, the gear 116 meshing with a gear 117 freely rotatably mounted on the counter shaft 99.

For engaging the speed range A which is primarily intended for soil working operations and pertains to the auxiliary transmission 90, the latter is provided with a bolt control member 118. This member or element 118 comprises control bolts 119 which are radially and axially displaceably guided in the gear 116. These bolts 119 will in the speed range A couple the counter shaft portion 115 with the gear 106. The bolt control member 118 furthermore comprises a control ring 120 which is arranged between the gears 114 and 116 and connects the bolts 119 to each other. For engaging the lowest speed or velocity range K, called the crawl velocity range, and for engaging a velocity range S of the auxiliary transmission 90, which velocity range S is intended primarily for transporting operations, a double shift sleeve 121 is provided between the two gears 113 and 117 and is non-rotatably but axially displaceably arranged on the counter shaft 99. In engaging position K, the gear 117 is by the sleeve 120 coupled to the counter shaft 99, whereas in the engaging position S, the counter shaft 99 is by sleeve 121 directly coupled to the output shaft 112. For best adapting the velocity ranges A, K and S to the above referred to conditions of utilization, the total transmission ratio formed by the two gear pairs 97 and 108 should be approximately 1 : 2.4, whereas the total transmission ratio obtained by the two gear pairs 108 and 109 should be about 1 : 4.5. In addition to the above mentioned structural elements, the auxiliary transmission 90 comprises a reversing back gearing system 122 with a reversing shaft 123 which is parallel to the input shaft 91 and which is journalled in the bearings 124. The gearing system 122 comprises a reversing gear 125 which is non-rotatably mounted on the reversing shaft 123 and which meshes with the gear 106. The back gearing system 122 furthermore comprises a reversing gear 126 which is non-rotatably and axially displaceably mounted on the reversing shaft 123 and which in a certain engaging position R intended for rearward drive and pertaining to the auxiliary transmission 90 is brought into mesh with the gear 113. The shifting of the reversing gear 126, of the bolt shift member 118 and of the double shift sleeve 121 should in an advantageous manner be effected by a common non-illustrated preselecting lever in the form of a stick shift or the like, which when designed as stick shift lever should perferably be guided in an H-shaped shift control element.

The change gear transmission according to FIG. 3 also comprises an auxiliary drive shaft 127 which passes through the hollow input shaft 91 and is followed by a take-off transmission 128 with a velocity range for the normal speed of $n = 500$ rpm and a velocity range for the normal speed of $n = 1,000$ rpm.

Figure 4:
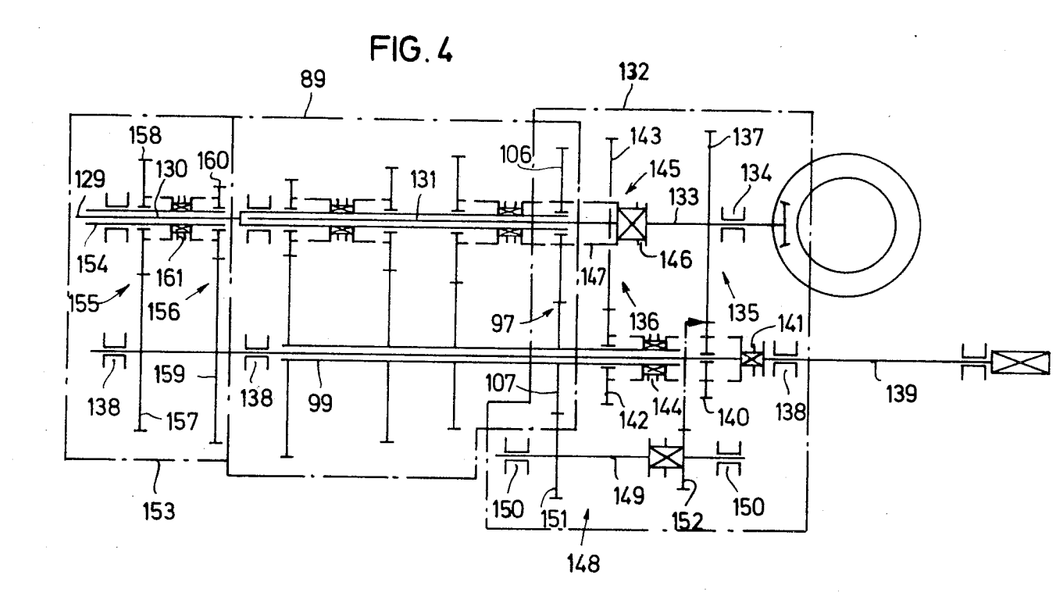
FIG. 4 shows still another embodiment of the invention with an auxiliary transmission following the main transmission group.

In contradistinction to the embodiment of FIG. 3, in the change gear transmission of FIG. 4 the main transmission group 89 is provided with an input shaft 129 which comprises a solid shaft portion 130 adapted to be driven by the above mentioned double clutch and also comprises a hollow shaft portion 131. In contradistinction to the embodiment of FIG. 3, the main transmission group 89 is followed by an auxiliary transmission 137 according to the invention which has an output shaft 133 that is arranged coaxially with regard to the input shaft 129 of the main transmission group 89. The output shaft 122 has its left-hand end portion journalled in the hollow shaft portion 131, whereas its right-hand end portion is journalled in a bearing 134. The group transmission 132, in addition to the output shaft 133 and the gear pair 97 forming a part of the transmission stages of the main transmission group 89, comprises a gear pair 135 and a further gear pair 136 preceding the gear pair 135, the gear pair 136 likewise forming a part of the present invention. The gear pair 135 comprises a gear 137 which is non-rotatably mounted on the out-out shaft 133 and furthermore comprises a gear 140 which is freely rotatably mounted on a take-off shaft 139 which is rotatable in bearings 138 and is coaxial to the hollow counter shaft 99. The gear 140 is adapted by means of a shift dog 141 selectively to be coupled to the take-off shaft 139 for driving the same when the vehicle is driven on the road. The gear pair 136 comprises a gear 142 freely rotatably mounted on the counter shaft 99 and also comprises a gear 143 which is non-rotatably mounted on the output shaft 133. To engage a velocity range A which is primarily intended for soil working operations, and to engage a crawl range K of the auxiliary transmission 132, there is provided a double shift sleeve 144 which is arranged between the two gears 140 and 142 in a non-rotatable but axially displaceable manner. In the velocity range A, the gear 142 is by means of the sleeve 144 coupled to the counter shaft 99, whereas the shaft 99 in engaging position K is directly connected to the gear 140 by means of the sleeve 144. For engaging the velocity range S of the auxiliary transmission 132 in order to carry out transporting operations, a bolt control member 145 is non-rotatably but displaceably mounted on the output shaft 133 of the transmission 132. This bolt control member 145 comprises a control or shift ring 146 which is arranged between the two gears 137 and 143 and which is connected to control bolts 147 which are axially guided in the gear 143, and by means of which in the velocity range position S the gear 106 is coupled to the output shaft 133.

In addition to the above mentioned structural elements, the auxiliary transmission 132 comprises a reversing gear system 148 with a reversing shaft 149 which extends parallel to the counter shaft 99 and which is journalled in bearings 150. The gear system 148 furthermore comprises a reversing gear 151 which is non-rotatably mounted on the reversing shaft 149 and which meshes with the gear 107. The reversing gear system 148 also comprises a reversing gear 152 which is non-rotatably but axially displaceably mounted on the reversing shaft 149. The reversing gear 152 is in a control position R of the auxiliary transmission 132 intended for rearward drive brought into mesh with the gear 137. The shifting of the reversing gear 152, of the bolt control member 145 and of the double shift sleeve 144 should in an advantageous manner be effected by a common not illustrated preselector lever which, when designed as a stick shift lever, may preferably be guided in an H-shaped control coulisse.

In addition to the main control group 89 and the auxiliary transmission 132, the change gear transmission according to FIG. 4 comprises a two-step take-off shaft transmission 153 which precedes the main control group 89. The transmission 153 comprises a hollow shaft 154 adapted selectively to be driven by the above mentioned double clutch, two gear pairs 155 and 156 adapted selectively to be coupled to the hollow shaft 154, and a take-off shaft 139 adapted to be driven by the gear pairs 155 and 156. The gear pair 155 comprises a gear 157 which is non-rotatably mounted on the take-off shaft 139 and also comprises a gear 158 which is freely rotatably mounted on the hollow shaft 154. The gear pair 156 comprises a gear 159 which is non-rotatably mounted on the take-off shaft 139 and also comprises a gear 160 which meshes with the gear 159 and is freely rotatably mounted on the hollow shaft 154. Between the two gears 158 and 159 there is provided a double control sleeve 161 which is non-rotatably mounted on the hollow shaft 154 but is axially displaceable thereon. By coupling the gear 158 to the hollow shaft 154 by means of the double control sleeve 161, for the take-off shaft 139 a normal speed of $n = 1,000$ rpm is made effective, whereas by coupling the gear 160 to the hollow shaft 154 by means of the double control sleeve 161, the normal speed of $n = 500$ rpm is made effective for the take-off shaft 139.

It may be mentioned that with the embodiment of FIG. 3 as well as with the embodiment of FIG. 4 the advantageous possibility exists of mounting on the reversing shaft 123, 149 an additional reversing gear in addition to the reversing gear 126, 152. This additional reversing gear 152 may selectively be brought into mesh with the gear 117, 143 so that with both embodiments a doubling of the shiftable rearward moving stages is obtained.

It is, of course, to be understood that the present invention is, by no means, limited to the particular showing in the drawings, but also comprises any modifications within the scope of the appended claims.

What we claim is:

1. In a multiple range change gear power transmitting device; an input shaft and an output shaft and a countershaft disposed on a pair of parallel axes; a main transmission and an auxiliary transmission in series between said input and output shafts, said main transmission comprising pairs of meshing gears and means for making the gears selectively effective, said auxiliary transmission comprising a first pair of meshing gears, one gear of said first pair being fixed to one of said input and output shafts, a further pair of meshing gears common to both transmissions, an additional pair of meshing gears between said first pair and said further pair, said pairs of gears being axially distributed and a gear of each said pair being disposed on each of said axes, one gear of said further pair being coaxial with and fixed to said countershaft, said additional pair of gears including one gear which is coaxial with and rotatable on said countershaft and another gear which is coaxial with the other gear of said further pair, said other gear of said additional pair being non-rotatably connected to the gear of said first pair which is coaxial therewith, control means selectively operable for coupling said countershaft to either one gear of said first pair which is coaxial therewith or said one gear of said additional pair, and means selectively operable for coupling said other gear of said additional pair to the said other gear of said further pair.

2. A power transmitting device according to claim 1 in which said auxiliary transmission precedes said main transmission and said one gear of said first gear pair of said auxiliary transmission is fixed to said input shaft, the other gear of said first gear pair being coaxial with and fixed to said other gear of said additional gear pair.

3. A power transmitting device according to claim 1 in which said auxiliary transmission precedes said main transmission and said one gear of said first gear pair of said auxiliary transmission is fixed to said input shaft, the other gear of said first gear pair being coaxial with said countershaft, said control means controlling the coupling of said countershaft to said other gear of said first pair and to said one gear of said additional pair.

4. A power transmitting device according to claim 1 in which said auxiliary transmission follows said main transmission and said one gear of said first gear pair of said auxiliary transmission is fixed to said output shaft while the other gear of said first pair is coaxial with and nonrotatably connected to said other gear of said additional pair.

5. A power transmitting device according to claim 1 in which said auxiliary transmission follows said main transmission and said one gear of said first gear pair of said auxiliary transmission is fixed to said output shaft while the other gear of said first pair is coaxial with and rotatable relative to said countershaft, said additional pair comprising a gear rotatable on each of said output shaft and countershaft, said control means being selectively operable for coupling said countershaft to said one gear of said additional pair or the other gear of said first pair, and means selectively operable for connecting said output shaft to said other gear of said further pair.

6. A power transmitting device according to claim 1 in which said auxiliary transmission precedes said main transmission and said one gear of said first gear pair is fixed to said input shaft, the velocity range provided by said first pair of gears of said auxiliary transmission together with the gear pairs of said main transmission overlapping the velocity range provided by said additional gear pair together with the gear pairs of said main transmission by about one velocity step of the main transmission as provided by the gear pairs thereof.

7. A power transmitting device according to claim 1 in which said auxiliary transmission precedes said main transmission and said one gear of said first gear pair is fixed to said input shaft, the velocity range provided by said additional pair of gears of said auxiliary transmission together with the gear pairs of said main transmission overlapping the velocity range provided by said further gear pair together with the gear pairs of said main transmission by about one velocity step of the main transmission as provided by the gear pairs thereof.

8. A power transmitting device according to claim 1 in which said auxiliary transmission precedes said main transmission and said one gear of said first gear pair is fixed to said input shaft, the drive ratio provided by said one gear pair together with said further gear pair being about 1:2.1 while the drive ratio provided by said one gear pair together with said additional gear pair is about 1:4.5.

9. A power transmitting device according to claim 1 in which said auxiliary transmission precedes said main transmission and said one gear of said first gear pair is fixed to said input shaft, the said control means for coupling said countershaft to the gear of said first pair which is coaxial therewith and for coupling said countershaft to said one gear of said additional pair is so constructed that when either gear is coupled to the countershaft the other is uncoupled therefrom.

10. A power transmitting device according to claim 1 in which said auxiliary transmission precedes said main transmission and said one gear of said first gear pair is fixed to said input shaft, the said other gear of said further pair being coaxial with said output shaft, said other gear of said additional pair also being coaxial with said output shaft and fixed to the other gear of said first pair, said means for coupling the said other gear of said further pair to said other gear of said additional pair comprising bolt elements extending axially through said other gear of said additional pair and reciprocable to and from engagement with said other gear of said further pair, and an actuating ring connected to said bolts and disposed between said first gear pair and said additional gear pair.

11. A power transmitting device according to claim 1 in which said auxiliary transmission precedes said main transmission and said one gear of said first gear pair is fixed to said input shaft, said control means for coupling said countershaft to said one gear of said additional pair and to the other gear of said first pair being operable to permit the coupling of said countershaft to one only of the gears at a time.

12. A power transmitting device according to claim 1 in which said auxiliary transmission precedes said main transmission and said one gear of said first gear pair is fixed to said input shaft, said other gear of said further pair being rotatable on said output shaft and coaxial with said input shaft, said other gear of said additional pair being fixed to said one gear of said first pair, said means for coupling said other gears together comprising bolts extending axially through said other gear of said additional pair and reciprocable therein so as to be engageable with said other gear of said further pair, and a control ring connected to said bolts and disposed between said first gear pair and said additional gear pair.

13. A power transmitting device according to claim 1 in which said auxiliary transmission precedes said main transmission and said one gear of said first gear pair is fixed to said input shaft, and selectively engageable reversing gearing interposed between said input shaft and a gear of said further gear pair.

14. A power transmitting device according to claim 1 in which said auxiliary transmission follows said main transmission and said one gear of said first gear pair is fixed to said output shaft, the velocity range provided by said first gear pair together with the gear pairs of said main transmission and the velocity range provided by said additional gear pair together with the gear pairs of said main transmission overlapping each other by the amount of about one velocity range of the main transmission.

15. A power transmitting device according to claim 1 in which said auxiliary transmission follows said main transmission and said one gear of said first gear pair is fixed to said output shaft, the velocity range provided by said further gear pair together with the gear pairs of said main transmission and the velocity range provided by said additional gear pair together with the gear pairs of said main transmission overlapping each other by the amount of about one velocity range of the main transmission.

16. A power transmitting device according to claim 1 in which said auxiliary transmission follows said main transmission and said one gear of said first gear pair is fixed to said output shaft, the transmission ratio of said first gear pair together with said further gear pair being about 1:2.1 and the transmission ratio of said first gear pair together with said additional gear pair being about 1:4.5.

17. A power transmitting device according to claim 1 in which said auxiliary transmission follows said main transmission and said one gear of said first gear pair is fixed to said output shaft, said countershaft being coaxial with said output shaft whereby said control means is operable to couple said countershaft to said one gear of said additional pair or to said output shaft via said one gear of said first pair.

18. A power transmitting device according to claim 1 in which said auxiliary transmission follows said main transmission and said one gear of said first gear pair is fixed to said output shaft, said other gear of said further gear pair being coaxial with said input shaft, said means for coupling said other gear of said further gear pair to said other gear of said additional gear pair comprising bolts reciprocable axially in said other gear of said additional gear pair to and from engagement with said other gear of said further gear pair, and an actuating ring connected to said bolts and disposed between said additional gear pair and said first gear pair.

19. A power transmitting device according to claim 1 in which said auxiliary transmission follows said main transmission and said one gear of said first gear pair is fixed to said output shaft, the other gear of said first pair being coaxial with said countershaft and said control means controlling the coupling of said countershaft to said one gear of said additional pair and to said other gear of said first pair.

20. A power transmitting device according to claim 1 in which said auxiliary transmission follows said main transmission and said one gear of said first gear pair is fixed to said output shaft, said other gear of said additional pair being fixed to said output shaft, said means for coupling said other gear of said additional pair to said other gear of said further pair comprising bolts reciprocable axially in said other gear of said additional pair to and from engagement with said other gear of said further pair, and an actuating ring connected to said bolts and disposed between said first gear pair and said additional gear pair.

21. A power transmitting device according to claim 1 in which said auxiliary transmission follows said main transmission and said one gear of said first gear pair is fixed to said output shaft, and selectively engageable reversing gearing interposed between a gear of said first gear pair and a gear of said further gear pair.

22. A power transmitting device according to claim 1 which includes means for effecting driving connection between the one of said input shaft and output shaft not connected to a gear of said first pair and at least one of said countershaft and a gear of said further pair.

* * * * *